Jan. 8, 1957  V. J. BILLSTROM  2,776,854
AUTOMATIC CLAMPING DEVICE
Filed Nov. 15, 1954

INVENTOR.
VICTOR J. BILLSTROM
BY HIS ATTORNEYS.
HARRIS, KIECH, FOSTER & HARRIS

# United States Patent Office 2,776,854
Patented Jan. 8, 1957

2,776,854

AUTOMATIC CLAMPING DEVICE

Victor J. Billstrom, Pasadena, Calif., assignor to Fletcher Aviation Corporation, Rosemead, Calif., a corporation of California Application November 15, 1954, Serial No. 468,618

9 Claims. (Cl. 292—256)

The present invention relates to a new and improved automatic clamping device which is primarily intended to be used in holding or clamping a flange against an adjacent surface.

For many industrial applications, it is necessary to hold a flange member against a surface as in closing the door of a pressure vessel, securing a first mold to a second mold, or the like.

A broad object of the instant invention is to provide a clamping device which is particularly suitable for industrial applications of this category.

A related object of the invention is to provide a clamping device of the class described which is comparatively simple to construct, is very efficient in use, and which is relatively inexpensive.

Further objects of the invention will be more fully apparent from the remainder of this specification and the appended claims.

The invention herein involved may be briefly summarized as involving rocking arms pivotally mounted upon what is referred to in the preceding discussion as a "surface," this rocking arm pivotally carrying a clamping arm which is designed to clamp against what was referred to in the preceding discussion as a "flange," securing this flange against the surface, and means capable of moving the clamping arm. With the invention, guide means are provided in order to govern the operation of both the rocking arm and the clamping arm. The present invention is, of course, more fully and completely described in the appended claims forming a part of this disclosure. Further details of it are best apparent with reference to the accompanying drawing, in which:

Figure 3:
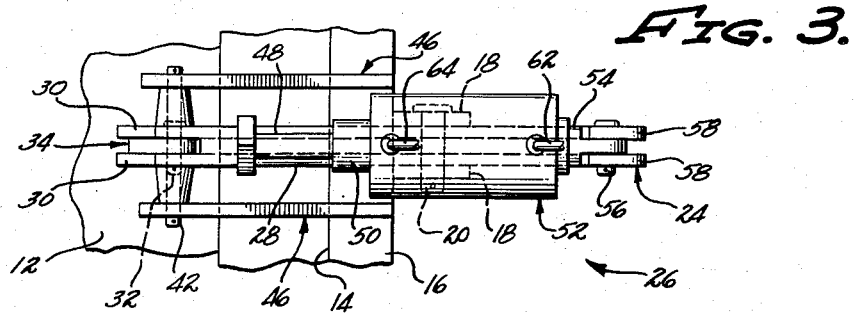
Fig. 3 is a top view of the clamping device in a closed position.

With reference to the drawing, it is seen that the illustrated embodiment of the instant invention is primarily concerned with clamping a flange 10 upon a part of member 12 against a surface 14 forming a part of a second member 16. Upon this second member 16 there are mounted projecting lugs 18 across which there is secured a pivot pin 20 which is designed to pivotally carry a lower projection 22 of a rocking arm 24 forming the principal part of the complete clamping device 26. This rocking arm includes a main body portion 28 on the end of which, adjacent the flange 10, there are formed projecting arms 30 between which there is mounted a pivot pin 32, which, in turn, pivotally carries a clamping arm 34. This clamping arm includes a cam surface 36 on a short lever arm and an elongated lever arm or shank 38 to the extremity 40 of which there is secured a pin 42 which projects from both sides of the clamping arm 34 beyond the confines of the rocking arm 24 so as to fit within slots 44 formed within guide arms 46. These guide arms are secured to the second member 16 as shown, on both sides of the rocking arm 24 so as to be located in planes generally parallel to the plane in which the rocking arm moves. The pin 42 is secured, between the two guide arms 46, to a connecting rod 48 which is mounted so as to pass through a bushing 50 within one end of the cylinder of a hydraulic servo-motor 52. The other end of this cylinder is provided with a projection 54 which is secured through the use of a pivot pin 56 to upstanding lugs 58 formed on an extremity of the rocking arm 24 remote from the projecting arms 30. As is seen in Fig. 3 of the drawings, this pivot pin 56 projects through these two lugs 58. Within the interior of the cylinder of servo-motor 52 there is located a piston 60 of conventional construction which is attached to the connecting rod 48. The cylinder also includes terminal connections 62 and 64 for the obvious purpose of introducing and removing appropriate hydraulic fluid into and from the hydraulic servo-motor 52 in order to move the piston 60 back and forth within the cylinder.

Figure 1:
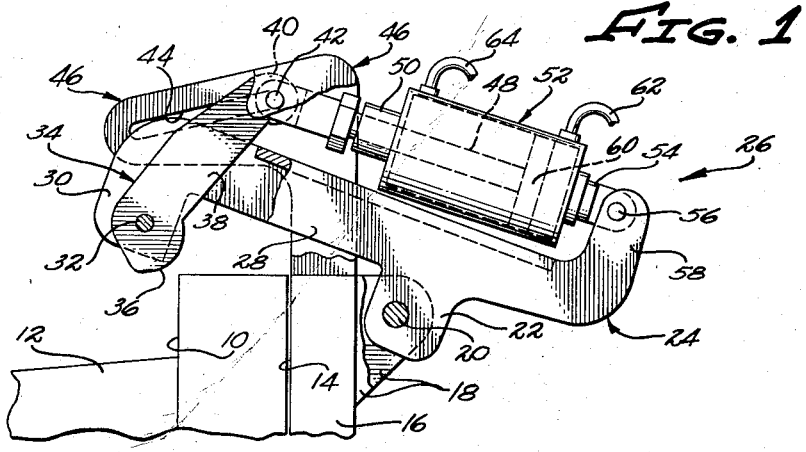
Fig. 1 is a side view of a clamping device of the invention in an open position.
Figure 2:
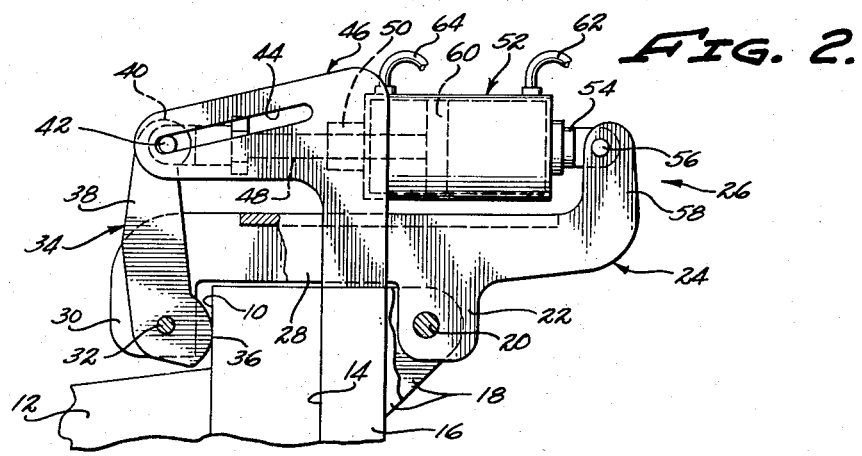
Fig. 2 is a similar side view of the same clamping device in a closed position.

The operation of the instant invention is believed to be obvious from the accompanying drawing. When the clamping device 26 is in an open position, the various parts are positioned as shown in Fig. 1 of the drawing with the rocking arm tilted back so that the cam surface 36 of the clamping arm 34 is completely clear of the flange 10. Thus, when the clamping device 26 is in this position, the flange 10 may be removed from the surface 14 as desired. When it is desired to clamp the flange 10 to this surface 14, the flange 10 is placed upon this surface and hydraulic fluid is introduced into the hydraulic servo-motor 52 through the terminal connections 62, and, simultaneously, displaced hydraulic fluid is removed from the servo-motor through the terminal connection 64 as the piston 60 is moved within the cylinder. During such motion, the connecting rod 48 is forced from within the hydraulic cylinder. This causes the pin 42 to be moved along a path determined by the contour of slots 44. During such camming action of the slots on pin 42, the attached clamping arm 34 is forced to rotate slightly in a counterclockwise direction, as viewed in Figs. 1 and 2 of the drawings, while, simultaneously, the pivot 32 is forced towards the position where it is located when the clamping device 26 is in a closed position, such as is shown in Fig. 2. The movement of this pivot 32 is imparted to the rocking arm 24, causing this rocking arm to rotate about the pivot 20 into the closed position shown in Fig. 2. As the rocking arm gradually reaches this closed position of Fig. 2, the cam surface 36 engages the flange 10, and, as further rotation of the clamping arm 34 continues, this cam surface 36 securely wedges or forces the flange 10 against the surface 14.

When it is desired to open the clamping device 26 so as to return it to its initial position, as shown in Fig. 1, hydraulic fluid is introduced into the hydraulic servo-motor 52 through the terminal connection 64, while, simultaneously, fluid is removed from the servo-motor 52 through the terminal connection 62. As this occurs, the piston 60 and the connecting rod 48 are pulled back to initial positions shown in Fig. 1. Simultaneously, this motion will be transmitted to the clamping arm 34 and the pivot pin 42. This pivot pin moving back along the slots 44, causing the clamping arm 34 and the rocking arm 24 to reverse the pivoting motion described in the preceding discussion and be removed from a clamping position to the retracted position as shown in Figure 1.

It is considered obvious, from the description of this invention given above, that a plurality of clamping devices 26 can be actuated simultaneously by introducing hydraulic fluid into all of these clamping devices at the same time. This makes the instant invention particularly applicable for use in those situations where it is desired to automatically actuate a series of individual clamping devices through the use of solenoid-controlled valves or like means. It is also considered obvious from the above discussion that the clamping device 26 illustrated may be mounted upon the flange 10 as well as upon the second member 16, shown and described above, and that the invention may be employed with structures having projections or depressions serving the same function as a flange.

The present invention is particularly to be distinguished over those related prior art devices in which various toggle or other mechanical linkages are employed. The use of the guide arms 46 with slots therein is particularly advantageous because of the ease of fabrication of these members, and the fact that they are virtually foolproof from an operative and manufacturing standpoint.

Those skilled in the art will realize that a number of minor modifications may be made concerning the subject matter of the instant invention without departing from the essential teachings of the invention. All such modifications are to be considered as part of the inventive concept insofar as they are defined by the appended claims.

I claim as my invention:

1. An automatic clamping device which is designed to be mounted upon a first member in order to hold a second member against said first member by engaging a flange surface on said second member, which comprises: a rocking arm pivotally mounted on said first member; a clamping arm pivotally attached to said rocking arm, said clamping arm including a cam surface designed to engage said flange surface; means pivotally attached to said clamping arm and said rocking arm for rotating said clamping arm with respect to said rocking arm; means projecting from said clamping arm; and guide means mounted on said first member, said guide means including a slot intersected by said means projecting from said clamping arm whereby as said means for rotating said clamping arm with respect to said rocking arm are actuated, said projecting means is slidably guided within said slot, controlling the rotation of said rocking arm.

2. An automatic clamping device which is designed to be mounted upon a first member in order to hold a second member against said first member by engaging a flange surface upon said second member, which comprises: a rocking arm pivotally mounted on said first member; a clamping arm pivotally attached to an extremity of said rocking arm, said clamping arm including a cam surface designed to engage said flange surface when said clamping arm is rotated with respect to said rocking arm; a hydraulic cylinder pivotally attached to said rocking arm; a connecting rod projecting from said hydraulic cylinder; means pivotally connecting said connecting rod and said clamping arm, whereby said clamping arm may be rotated with respect to said rocking arm when said hydraulic cylinder is actuated; means projecting from said clamping arm; and guide means including a slot and mounted on said first member with said projecting means engaging said slot whereby the movement of said projecting means is restricted by said slot.

3. A device as defined in claim 2, including means for introducing and removing hydraulic fluid into and from said hydraulic cylinder in order to move said connecting rod into and out of said hydraulic cylinder.

4. A device as defined in claim 3, wherein said guide means are mounted in planes parallel to the plane of rotation of said rocking arm.

5. A clamping device comprising: a support; a rocking member pivoted on said support; a clamping element pivotally carried by the rocking member; an actuating means; and means, including a confined guided connection, operatively connecting said actuating means, said rocking member, said clamping member and said support so actuation of said actuating means will rock said rocking member and clamping member relative to said support and move said clamping member about its pivot axis relative to said rocking member.

6. A clamping device for clamping a structural device and a structural member together comprising: a rocking member pivotally mounted on said structural member; a clamping member, including an abutment adapted to engage said structural device during the clamping of the structural device and structural member together, pivotally carried by said rocking member; means operatively connected to said structural member, said rocking member and said clamping member for rotating said clamping member about said rocking member and for rotating said rocking member on said structural member, the connections between said means and said three members including three paired connections only two of which are turning pairs.

7. A clamping device adapted to clamp a first member solidly against a second member comprising: a structural element pivotally mounted on said second member; a double acting extensible motor, having a movable rod, pivotally mounted on said structural element; a clamping arm pivoted on said structural element including an end portion pivotally connected to said movable rod and a second portion disposed to engage said first member when the device is in its clamping position; and a confined path cam and cam follower means connecting between said clamping arm and said second member whereby actuation of said motor will rotate said structural element about said second member and simultaneously rotate said clamping arm on said structural element.

8. A clamping device which is designed to be mounted upon a first member in order to hold a second member against said first member which comprises: a rocking arm adapted to be pivotally mounted on said first member; a clamping arm pivotally attached to said rocking arm, said clamping arm including a projecting structure and a portion adapted to engage said second member; extensible means pivotally attached to said clamping arm and pivotally attached to said rocking arm for rotating said clamping arm with respect to said rocking arm; and guide means mounted on said first member, said guide means connected to said projecting structure in guiding relation whereby as said means for rotating said clamping arm with respect to said rocking arm is actuated, said projecting structure is guided by said guide means to cause constrained rotation of said rocking arm.

9. A clamping device which is designed to be mounted upon a first member in order to hold a second member against said first member which comprises: a rocking arm pivotally mounted on said first member; a clamping arm pivotally attached to an extremity of said rocking arm, said clamping arm including a projecting structure and a portion adapted to engage said second member when said clamping arm is rotated with respect to said rocking arm; a motor having extensible ends, one of said ends being pivotally connected to said rocking arm and the other of said ends having a pivoted connection to said clamping arm whereby said clamping arm may be rotated with respect to said rocking arm when said motor ends are operated; and a second connection between said projecting structure and said first member, whereby said connection between the clamping arm and said other end of the motor is constrained along a confined path to cause rotation of said rocking arm relative to said first member.

References Cited in the file of this patent
UNITED STATES PATENTS

| | | |
|---|---|---|
| 2,513,569 | Kuehlthau | July 4, 1950 |
| 2,679,418 | Cisco | May 25, 1954 |